(No Model.)
L. B. WILSON.
COMBINED MATCH AND TOOTH PICK BOX.
No. 271,011. Patented Jan. 23, 1883.
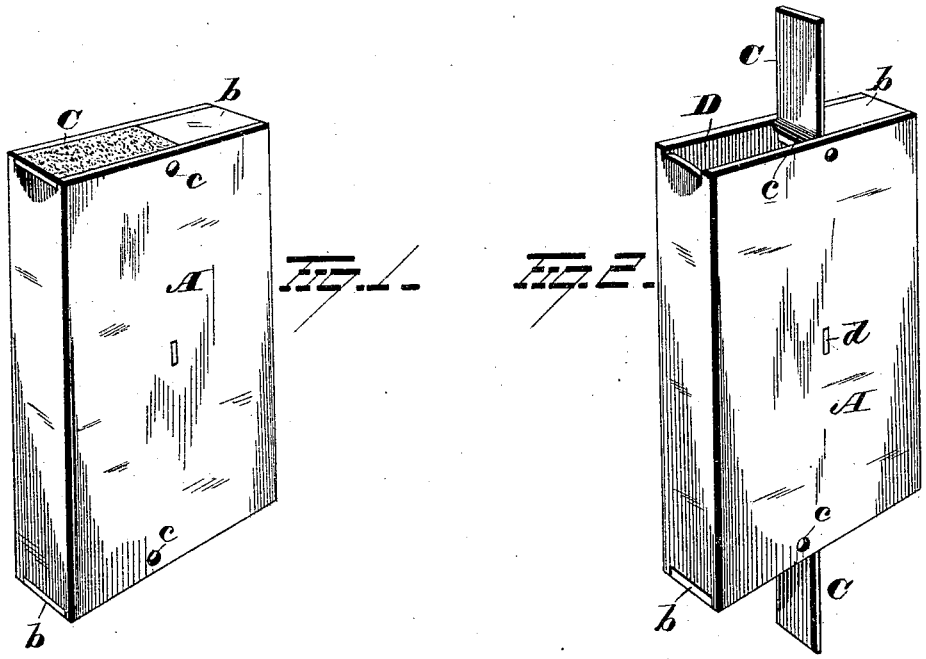
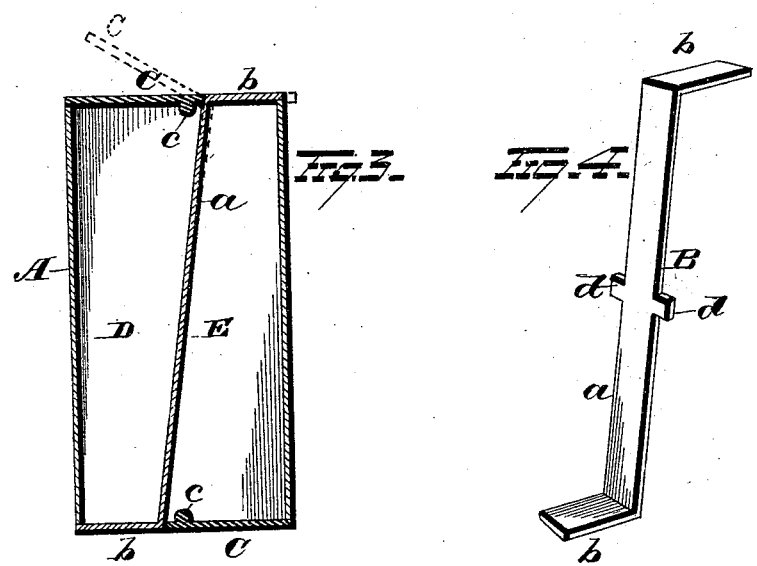
WITNESSES
E. J. Nottingham
J. J. Downing
INVENTOR
L. B. Wilson
By H. A. Seymour
Attorney

UNITED STATES PATENT OFFICE.

LISTON B. WILSON, OF ZANESVILLE, OHIO.

COMBINED MATCH AND TOOTH-PICK BOX.

SPECIFICATION forming part of Letters Patent No. 271,011, dated January 23, 1883.

Application filed October 14, 1882. (No model.)

*To all whom it may concern:*

Be it known that I, L. B. WILSON, of Zanesville, in the county of Muskingum and State of Ohio, have invented certain new and useful Improvements in Combined Match and Tooth-Pick Box; and I do hereby declare the following to be a full, clear, and exact description of the invention, such as will enable others skilled in the art to which it pertains to make and use the same.

My invention relates to an improvement in combined match and tooth-pick box, the object of the same being to provide a double-compartment box that will be small in compass, of few parts, durable in use, and one that can be manufactured at a small initial cost; and with these ends in view my invention consists in certain details in construction and combinations of parts, as will be more fully described, and pointed out in the claims.

In the accompanying drawings, Figure 1 is a perspective view of my improvement with the lids in closed adjustment. Fig. 2 is a similar view with the hinged ends in open adjustment. Fig. 3 is a view of the box in cross-section, the deflection of the combined spring and partition caused by partially opening one of the covers being shown by dotted lines; and Fig. 4 is a detached view of the combined partition and spring.

A represents a box, rectangular in shape and open at both ends; B, the combined partition and spring, and C the box-lids, pivotally secured to the opposite ends of the box in any suitable manner. The box A is made of sheet metal, bent in the desired form, and secured by soldering or otherwise. This box can be of any convenient size or sizes, and is divided longitudinally into two separate and distinct compartments, D E, each of which latter is provided with a separate lid. In the box shown in the drawings the compartments are both the same size, and are designed especially for matches and tooth-picks, respectively; but it is apparent that they can be unequal sizes, and one be adapted for cigarettes and the other for matches.

The combined partition and spring B consists of the body *a* and the two extremities *b*, the latter being bent at right or nearly right angles to the body *a*, but in opposite directions, so as to form bottoms for both compartments. The body *a* of the combined partition and spring is as long as the box, and is secured therein in any suitable manner at one or more points throughout its length to the opposite faces or walls of the box. This partition should not be secured near its ends to the box, but sufficiently far therefrom to enable the ends or terminals of the body to form springs, for the purpose of holding the lids in closed position. I prefer, however, to secure the partition at one point midway its length to the opposite faces of the box by simply forming lugs or projections *d* on the opposite edges of the partition, passing them through open slots in the faces of the box, and securing them therein by solder or otherwise. When the combined partition and spring is secured in position the opposite ends *b* thereof form bottoms to the compartments by partly closing up the opposite ends of the box.

The lids C are of size sufficient to close the open spaces in the ends of the box, and are pivotally secured to the box by the pintles *c*, which latter are rigidly secured to the lids C, while the opposite ends thereof are loosely journaled in the opposite faces of the box. The extremities of the combined partition and spring B bear against the rear hinged ends of the lids C and constantly exert a pressure thereon, and hold it either in a closed or open position. The partition, instead of passing straight through the box, can pass in an inclined or diagonal direction, so as to make the compartments larger near the open ends thereof than at the bottoms. This partition, besides performing the functions above enumerated, also prevents the box from being crushed or distorted in shape. One end of this box— preferably the end opening into the match-compartment, is roughened—so as to afford a surface for striking the match, and also to enable the user to distinguish by feeling the box the end containing the matches without the necessity of opening the lids.

My improvement is simple in construction, is durable in use, and can be manufactured at a small initial cost.

It is evident that slight changes in the construction might be resorted to without departing from the spirit of my invention, and hence I would have it understood that I do not limit myself to the exact construction shown, but consider myself at liberty to make such changes and alterations as fairly fall within the spirit and scope of my invention.

Having fully described my invention, what I claim as new, and desire to secure by Letters Patent, is—

1. The combination, with a metallic case open at both ends, of a partition provided with bent ends and dividing the box into two separate compartments, and forming a bottom for each of the compartments, substantially as set forth.

2. The combination, with a metallic case open at both ends, of the combined partition and spring secured within and dividing the box into two compartments, and provided with bent ends, forming the bottoms of the said compartments, and hinged lids secured to the said box and covering the openings of the compartments, substantially as set forth.

3. The combination, with the rectangular box, open at both ends, of the combined partition and spring B and the lids C, all of the above parts constructed, combined, and adapted to operate as described.

4. As a new article of manufacture, a combined match and tooth-pick box, consisting of a rectangular metallic case, open at both ends, a combined partition and spring, dividing the box into two compartments and forming a bottom for each of said compartments, and hinged lids adapted to be held in open and closed position by the combined partition and spring, substantially as set forth.

5. The combination, with the rectangular box, open at both ends, of the combined partition and spring and the lids, one of which latter is roughened, substantially as and for the purpose set forth.

In testimony whereof I have signed this specification in the presence of two subscribing witnesses.

LISTON B. WILSON.

Witnesses:
D. T. JOHNSON,
W. H. JOHNSON.